United States Patent
Siegel

(10) Patent No.: US 10,064,425 B2
(45) Date of Patent: Sep. 4, 2018

(54) APPARATUS FOR MARINATING FOOD

(71) Applicant: Louis Siegel, Rockville, MD (US)

(72) Inventor: Louis Siegel, Rockville, MD (US)

( * ) Notice: Subject to any disclaimer, the term of this patent is extended or adjusted under 35 U.S.C. 154(b) by 0 days.

(21) Appl. No.: 15/629,266

(22) Filed: Jun. 21, 2017

(65) Prior Publication Data

US 2018/0027852 A1 Feb. 1, 2018

Related U.S. Application Data

(60) Provisional application No. 62/366,949, filed on Jul. 26, 2016.

(51) Int. Cl.
*A47J 27/00* (2006.01)
*A23L 13/70* (2016.01)
*A22C 9/00* (2006.01)

(52) U.S. Cl.
CPC .............. *A23L 13/70* (2016.08); *A22C 9/00* (2013.01); *A23V 2002/00* (2013.01)

(58) Field of Classification Search
CPC ...... A22C 9/00; A47J 37/0713; A47J 37/0682
USPC ......... 99/341, 345, 375, 389, 400, 403, 408, 99/425, 413, 415, 416, 417, 418, 410, 99/444–446, 450, 482, 495, 505, 508, 99/510, 523
See application file for complete search history.

(56) References Cited

U.S. PATENT DOCUMENTS

| | | | |
|---|---|---|---|
| 4,012,808 A | 3/1977 | Strong | |
| 4,265,766 A | 5/1981 | Crossley | |
| 4,604,989 A | 8/1986 | Kita | |
| 4,883,195 A | 11/1989 | Ott | |
| 5,057,332 A | 10/1991 | Davidson | |
| 5,111,803 A * | 5/1992 | Barker | A47J 37/0713 126/41 R |
| 6,405,645 B1 | 6/2002 | Green | |
| 6,446,546 B1 | 9/2002 | Hodson | |
| 6,869,351 B1 | 3/2005 | Kell | |
| 6,908,375 B1 | 6/2005 | Kadhim | |
| 7,025,213 B2 | 4/2006 | Chen | |
| D582,211 S | 12/2008 | Green | |
| D582,214 S | 12/2008 | Hutzler et al. | |
| 7,670,042 B2 | 3/2010 | Cheung | |
| 8,574,043 B2 | 11/2013 | Zean | |
| 2006/0266227 A1 | 11/2006 | Britt | |
| 2009/0095170 A1 | 4/2009 | Hutzler | |
| 2014/0311361 A1 | 10/2014 | Wangler | |

OTHER PUBLICATIONS

"The Original Chop Tray—2 Cutting Boards w/Juice Collection & Marinating Tray," http://www.ebay.com/itm/The-Original-Chop-Tray-2-Cutting-Boards-w-Juice-Collection-Marinating-Tray-/331485235013, found Oct. 27, 2016.

Hutzler, "Hutzler TenderMade Marinating Tray," https://www.amazon.com/Hutzler-669-TenderMade-Marinating-Tray/dp/B001AO1YXW/ref=cm_cr_arp_d_product_top?ie=UTF8, found Oct. 27, 2016.

(Continued)

*Primary Examiner* — Phuong Nguyen

(74) *Attorney, Agent, or Firm* — Williams IPS; Larry Williams

(57) ABSTRACT

One aspect of the present invention pertains to a method of marinating food. Another aspect of the present invention pertains to an apparatus for marinating food.

1 Claim, 5 Drawing Sheets

(56) References Cited

OTHER PUBLICATIONS

"Mr. Barbecue 2-pc Grill Station Marinade Tray Set," https://www.kohls.com, found Oct. 27, 2016.
"The Original Chop Tray ~ 2 Cutting Boards w/Juice Collection & Marinating Tray," http://www.ebay.com/itm/The-Original-Chop-Tray-2-Cutting-Boards-w-Juice-Collection-Marinating-Tray-/331485235013, found Oct. 27, 2016.
"Vtg Tupperware Marinating Tray Bacon Hotdog Deli Meat Keeper #1292-8 replacement," http://www.ebay.com/itm/Vtg-Tupperware-Marinating-Tray-Bacon-Hotdog-Deli-Meat-Keeper-1292-8-replacement-/151767602106, found Oct. 27, 2016.
Berkley Mason, "Meet the Idea Man the idea man," East County Observer, p. 7, Sep. 8, 2016.

\* cited by examiner

APPARATUS FOR MARINATING FOOD

CROSS-REFERENCE TO RELATED APPLICATIONS

The present application claims benefit of U.S. Provisional Patent application Ser. No. 62/366,949, entitled "FOOD MARINATER USING METHODS OF SPACING AND WICKING" to Louis Siegel, filed Jul. 26, 2016. The content of U.S. Provisional Patent application Ser. No. 62/366,949, entitled "FOOD MARINATER USING METHODS OF SPACING AND WICKING" to Louis Siegel, filed Jul. 26, 2016 is incorporated herein in its entirety by this reference for all purposes.

BACKGROUND

The present inventor has developed one or more solutions that may address one or more problems related to marinating food.

SUMMARY

One aspect of the present invention pertains to an apparatus for marinating food. Another aspect of the present invention pertains to a method of marinating food.

It is to be understood that the invention is not limited in its application to the details of construction and to the arrangements of the components set forth in the following description. The invention is capable of other embodiments and of being practiced and carried out in various ways. In addition, it is to be understood that the phraseology and terminology employed herein are for the purpose of description and should not be regarded as limiting.

Figure 1:
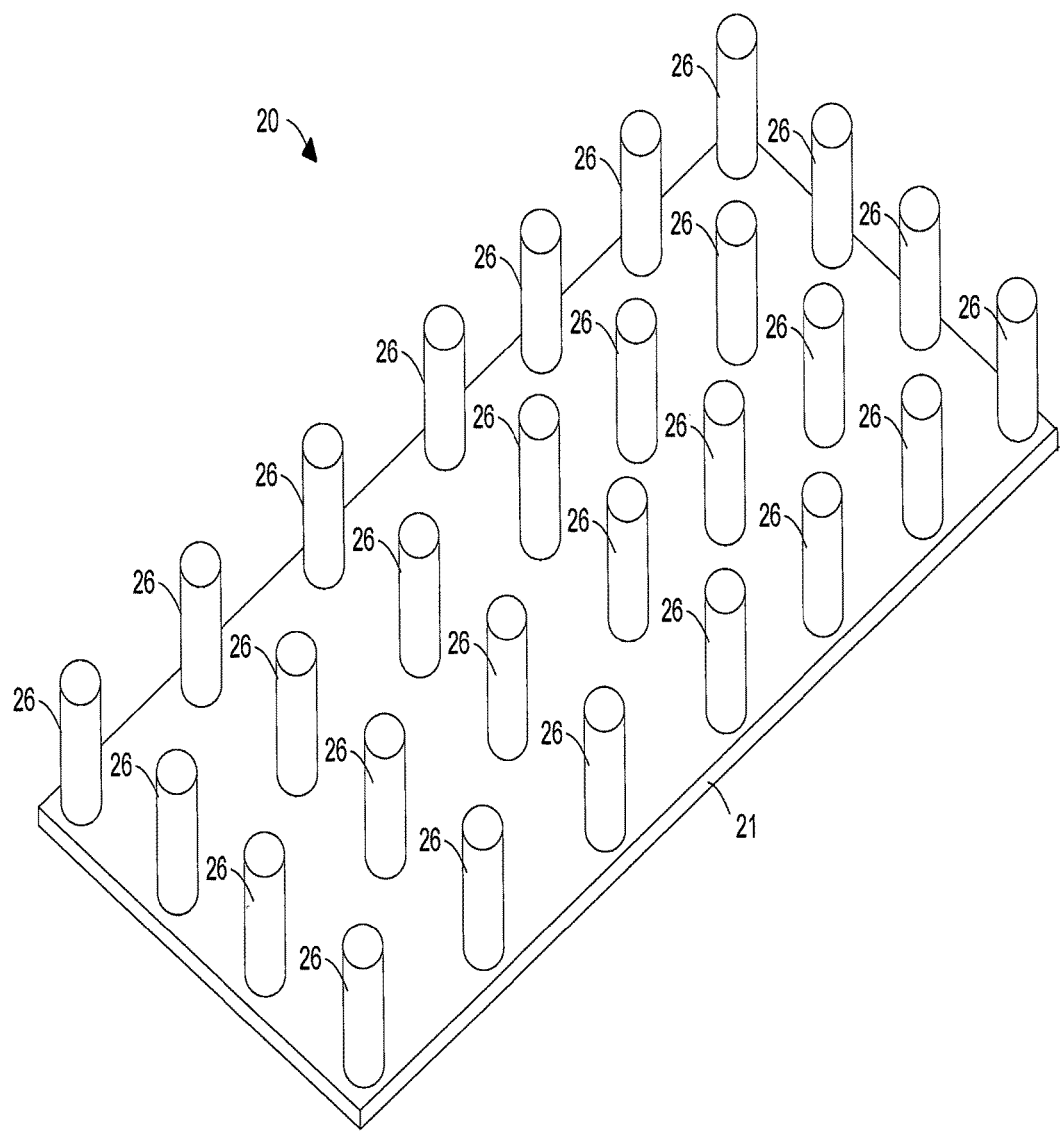
FIG. 1 is a diagram of an apparatus according to one or more embodiments of the present invention.

Skilled artisans appreciate that elements in the figures are illustrated for simplicity and clarity and have not necessarily been drawn to scale. For example, the dimensions of some of the elements in the figures may be exaggerated relative to other elements to help to improve understanding embodiments of the present invention.

DESCRIPTION

In the following description of the figures, identical reference numerals have been used when designating substantially identical elements or processes that are common to the figures.

Unless otherwise defined, all technical and scientific terms used herein have the same meaning as commonly understood by one of ordinary skill in the art to which this invention belongs. In case of conflict with publications, patent applications, patents, and other references mentioned and/or incorporated herein by reference, the present specification, including definitions, will control.

Various embodiments the present invention may include any of the described features, alone or in combination. Other features and/or benefits of this disclosure will be apparent from the following description.

For the following defined terms, these definitions shall be applied, unless a different definition is given in the claims or elsewhere in this specification. For the present disclosure, the term "dish" is defined as substantially any container capable of holding a liquid such as, but not limited to, a bowl, a pan, a pot, and a tray. The following description is directed toward the use of liquid marinades; the marinades may be combinations of liquids such as but not limited to oils, water, dissolved solids, un-dissolved solids, and/or other components.

All numeric values are herein defined as being modified by the term "about," whether or not explicitly indicated. The term "about" generally refers to a range of numbers that a person of ordinary skill in the art would consider equivalent to the stated value to produce substantially the same properties, function, result, etc. A numerical range indicated by a low value and a high value is defined to include all numbers subsumed within the numerical range and all subranges subsumed within the numerical range. As an example, the range 10 to 15 includes, but is not limited to, 10, 10.1, 10.47, 11, 11.75 to 12.2, 12.5, 13 to 13.8, 14, 14.025, and 15.

The order of execution or performance of the operations or the processes in embodiments of the invention illustrated and described herein is not essential, unless otherwise specified. That is, the operations or the processes may be performed in any order, unless otherwise specified, and embodiments of the invention may include additional or fewer operations or processes than those disclosed herein. For example, it is contemplated that executing or performing a particular operation or process before, simultaneously with, contemporaneously with, or after another operation or process is within the scope of aspects of the invention.

As will be understood by a person skilled in the art, aspects of the present invention may be embodied as a system, method, or apparatus.

Aspects of the present invention may be described below with reference to methods, processes, and apparatus (systems), according to one or more embodiments of the invention.

The following description is primarily directed towards marination of food such as, but not limited to, cuts of meat such as, but not limited to, beef, chicken, lamb, pork with liquid marinades.

The following document is incorporated herein in its entirety by this reference for all purposes: U.S. Provisional Patent application Ser. No. 62/366,949, entitled "FOOD MARINATER USING METHODS OF SPACING AND WICKING" to Louis Siegel, filed Jul. 26, 2016.

Reference is now made to FIG. 1 where there is shown a perspective view of an apparatus 20 according to one or more embodiments of the present invention. According to one embodiment of the present invention, apparatus 20 is for marinating food when used in a dish with marinade.

According to one or more embodiments of the present invention, apparatus 20 comprises a substantially planar stage 21 having an upper surface and a lower surface. Planar stage 21 comprises a material such as a food grade material; and for one or more embodiments of the present invention, the material is substantially rigid. Apparatus 20 further comprises a plurality of projections 26 extending up from planar stage 21. The plurality of projections 26 are sized and disposed so as to support an item of food. For one or more embodiments of the present invention, plurality of projections 26 comprise a food grade material. Plurality of projections 26 are spaced apart and are of sufficient height to allow marinade flow across planar stage 21 under the food and over one or more edges of planar stage 21. When in use for one or more embodiments of the present invention, apparatus 20 is placed in the dish with marinade so as to hold the underside of the food in contact with the marinade. According to one or more embodiments of the present invention, projections 26 are shaped to include a spherical cap, a truncated cone, and/or a truncated pyramid which contact the food.

According to one or more embodiments of the present invention, substantially planar stage 21 has one or more through holes to allow passage of marinade therethrough (holes not shown in FIG. 1). In other words, planar stage 21 may be a grid-like structure with numerous holes.

Figure 2:
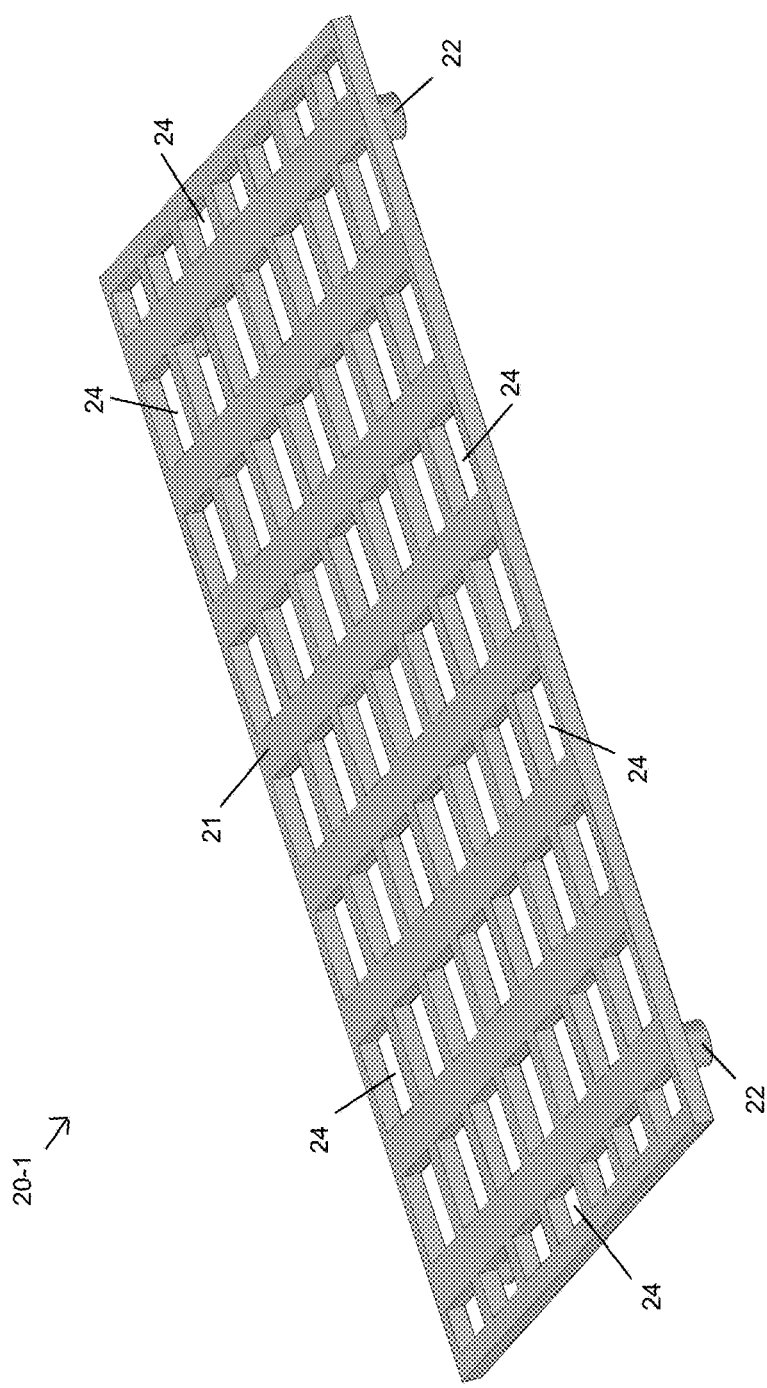
FIG. 2 is a diagram of an apparatus according to one or more embodiments of the present invention.

Reference is now made to FIG. 2 where there is shown a perspective view of an apparatus 20-1 according to one or more embodiments of the present invention. According to one embodiment of the present invention, apparatus 20-1 is for marinating food when used in a dish with marinade.

According to one or more embodiments of the present invention, apparatus 20-1 comprises a substantially planar stage 21 having an upper surface and a lower surface. Substantially planar stage 21 has one or more through holes 24 to allow passage of marinade. Optionally, planar stage 21 may be a grid-like structure having numerous holes 24. For one or more embodiments, planar stage 21 comprises a material such as a food grade material. For one or more embodiments of the present invention, the material is substantially rigid. According to one or more embodiments of the present invention, apparatus 20-1, further comprises one or more supports 22 extending from planar stage 21 to hold planar stage 21 away from the bottom of the dish (dish not shown in FIG. 2) an amount sufficient to allow marinade to flow between the underside of planar stage 21 and the bottom of the dish. The supports may have a variety of dimensions and may have holes and/or passages ways and/or may be spaced apart to establish spacing sufficient to allow marinade flow such as beneath the food and/or beneath stage 21.

As an option for one or more embodiments of the present invention, the one or more supports 22 are shaped to include an inverted spherical cap, an inverted truncated cone, and/or an inverted truncated pyramid which contact the bottom of the dish when apparatus 20-1 is in use. The embodiment shown in FIG. 2 has cylindrical shapes for supports 22.

According to one or more embodiments of apparatus 20-1, substantially planar stage 21 has one or more through holes 24 to allow passage of marinade therethrough from the bottom of dish upward to contact bottom of the food during marination. Apparatus 20-1 further comprises one or more supports 22 extending down from planar stage 21 to hold planar stage 21 away from the bottom of the dish an amount sufficient to allow marinade to flow between the underside of planar stage 21 and the bottom of the dish. The one or more supports having holes and/or inter spacing to allow marinade flow.

Figure 3:
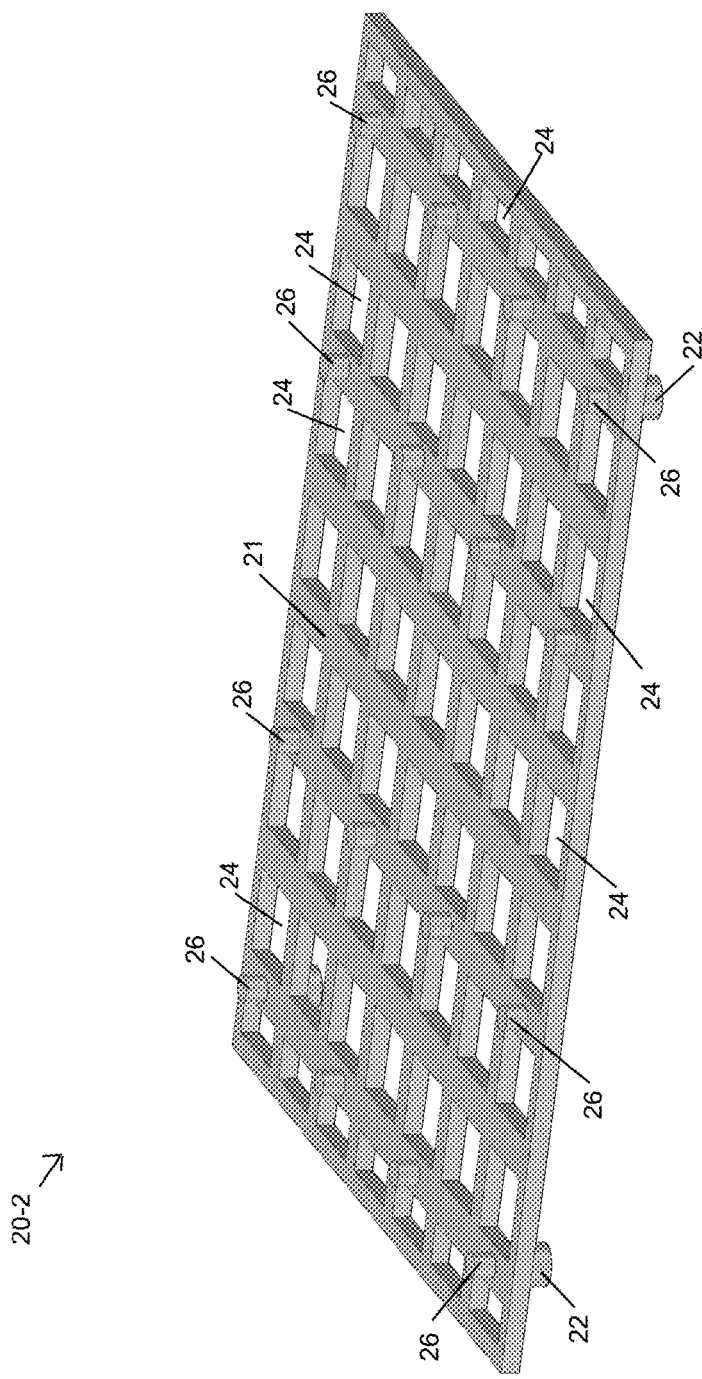
FIG. 3 is a diagram of an apparatus according to one or more embodiments of the present invention.

Reference is now made to FIG. 3 where there shown a perspective view of an apparatus 20-2 according to one or more embodiments of the present invention. According to one embodiment, apparatus 20-2 is for marinating food when used in a dish with marinade.

According to one or more embodiments of the present invention, apparatus 20-2 comprises a substantially planar stage 21 having an upper surface and a lower surface. Substantially planar stage 21 has one or more through holes 24 to allow passage of marinade. Optionally, planar stage 21 may be a grid-like structure with numerous holes 24. For one or more embodiments, planar stage 21 comprises a material such as a food grade material. For one or more embodiments of the present invention, the material is substantially rigid. According to one or more embodiments of the present invention, apparatus 20-2, further comprises one or more supports 22 extending from planar stage 21 to hold planar stage 21 away from the bottom of the dish (dish not shown in FIG. 3) an amount sufficient to allow marinade to flow between the underside of planar stage 21 and the bottom of the dish. Supports 22 may have a variety of dimensions and may have holes and/or passage ways and/or may be spaced apart to establish spacing sufficient to allow marinade flow such as beneath the food and/or beneath stage 21. The embodiment shown in FIG. 3 has supports 22 spaced apart sufficiently to allow marinade flow.

As an option for one or more embodiments of the present invention, the one or more supports 22 are shaped to include an inverted spherical cap, an inverted truncated cone, and/or an inverted truncated pyramid which contact the bottom of the dish when apparatus 20-2 is in use. The embodiment shown in FIG. 3 has cylindrical shapes for supports 22.

Apparatus 20-2 further comprises a plurality of projections 26 extending up from planar stage 21. The plurality of projections 26 are sized and disposed so as to support the food. For one or more embodiments of the present invention, plurality of projections 26 comprise a food grade material. Plurality of projections 26 are spaced apart and are of sufficient height to allow marinade flow under the food. When in use for one or more embodiments of the present invention, apparatus 20-3 is placed in the dish with marinade so as to hold the underside of the food in contact with the marinade.

Figure 4:
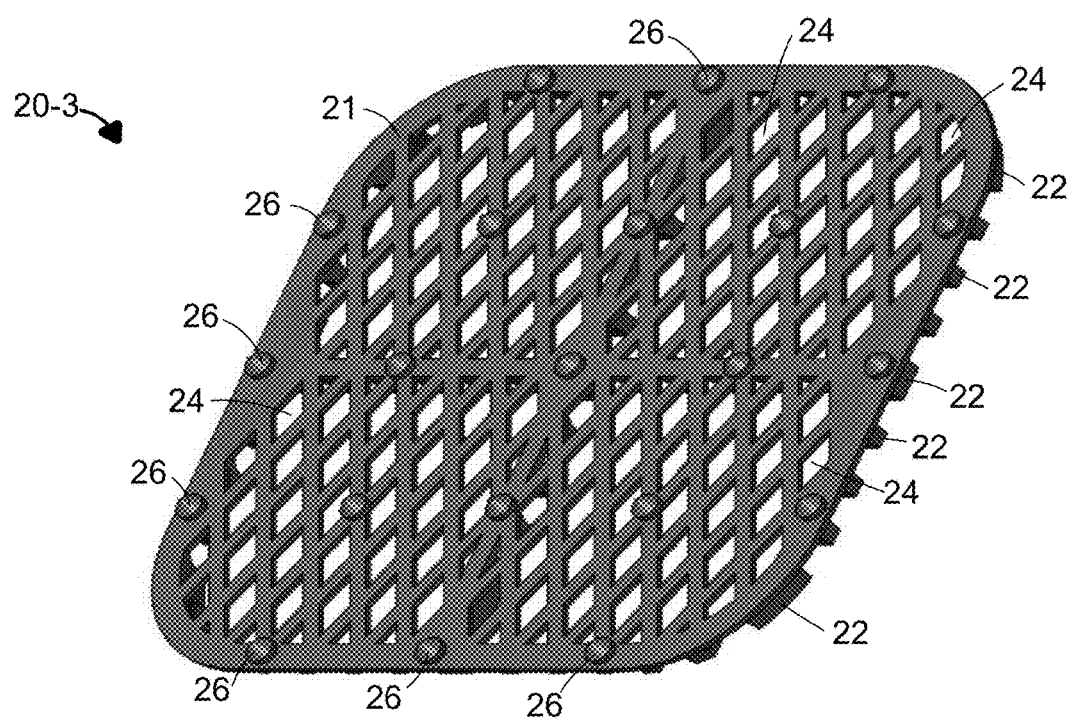
FIG. 4 is a diagram of an apparatus according to one or more embodiments of the present invention.

Reference is now made to FIG. 4 where there shown a perspective view of an apparatus 20-3 according to one or more embodiments of the present invention. According to one embodiment, apparatus 20-4 is for marinating food when used in a dish with marinade.

According to one or more embodiments of the present invention, apparatus 20-3 comprises a substantially planar stage 21 having an upper surface and a lower surface. Substantially planar stage 21 has one or more through holes 24 to allow passage of marinade. Optionally, planar stage 21 may be a grid-like structure with numerous holes 24. For the embodiment shown in FIG. 4, the through holes are diamond shaped. For one or more embodiments, planar stage 21 comprises a material such as a food grade material. For one or more embodiments of the present invention, the material is substantially rigid.

According to one or more embodiments of the present invention, apparatus 20-3, further comprises one or more supports 22 extending from planar stage 21 to hold planar stage 21 away from the bottom of the dish (dish not shown in FIG. 4) an amount sufficient to allow marinade to flow between the underside of planar stage 21 and the bottom of the dish. Supports 22 may have a variety of dimensions and may have holes and/or passage ways and/or may be spaced apart to establish spacing sufficient to allow marinade flow such as beneath the food and/or beneath stage 21. The embodiment shown in FIG. 4 has supports 22 spaced apart sufficiently to allow marinade flow.

As an option for one or more embodiments of the present invention, the one or more supports 22 are shaped to include an inverted spherical cap, an inverted truncated cone, and/or an inverted truncated pyramid which contact the bottom of the dish when apparatus 20-3 is in use.

Apparatus 20-3 further comprises a plurality of projections 26 extending up from planar stage 21. The plurality of projections 26 are sized and disposed so as to support the food. For one or more embodiments of the present invention, plurality of projections 26 comprise a food grade material. Plurality of projections 26 are spaced apart and are of sufficient height to allow marinade flow under the food. For the embodiment shown in FIG. 4, projections 26 are shaped to include truncated cones. When in use for one or more embodiments of the present invention, apparatus 20-3 is placed in the dish with marinade so as to hold the underside of the food in contact with the marinade.

Figure 5:
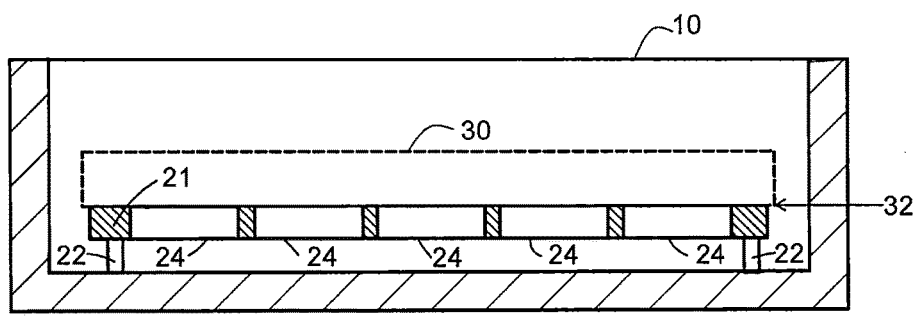
FIG. 5 is a diagram of an apparatus according to one or more embodiments of the present invention.

Reference is now made to FIG. 5 where there is shown a cross-section side view of a dish 10 and an apparatus according to one or more embodiments of the present invention supporting a food item 30. For marinating the underside of food item 30, an amount of marinade (marinade not shown in FIG. 5) would also be present in dish 30 at least up to a level to reach the lower surface of food item 30. Any embodiments of the present invention described above and/or illustrated in FIGS. 1, 2, 3, and 4, could be used as the apparatus in FIG. 5. The apparatus illustrated in FIG. 5 is essentially the same as the embodiment shown in and described for FIG. 2 above.

More specifically, the apparatus shown in cross section in FIG. 5 comprises a substantially planar stage 21 having an upper surface and a lower surface. Substantially planar stage 21 has one or more through holes 24 to allow passage of marinade. Optionally, planar stage 21 may be a grid-like structure with numerous holes 24. For one or more embodiments, planar stage 21 comprises a material such as a food grade material. For one or more embodiments of the present invention, the material is substantially rigid. According to one or more embodiments of the present invention, the apparatus further comprises one or more supports 22 extending from planar stage 21 to hold planar stage 21 away from the bottom of dish 10 an amount sufficient to allow marinade to flow between the underside of planar stage 21 and the bottom of the dish. Supports 22 may have a variety of dimensions and may have holes and/or passage ways and/or may be spaced apart to establish spacing sufficient to allow marinade flow such as beneath the food and/or beneath stage 21.

As an option for one or more embodiments of the present invention, the one or more supports 22 are shaped to include an inverted spherical cap, an inverted truncated cone, and/or an inverted truncated pyramid which contact the bottom of the dish when the apparatus is in use. The embodiment shown in FIG. 5 has cylindrical shapes for supports 22.

According to one or more embodiments of the apparatus, substantially planar stage 21 has one or more through holes 24 to allow passage of marinade therethrough from the bottom of dish 10 upward to contact underside of the food during marination.

Figure 6:
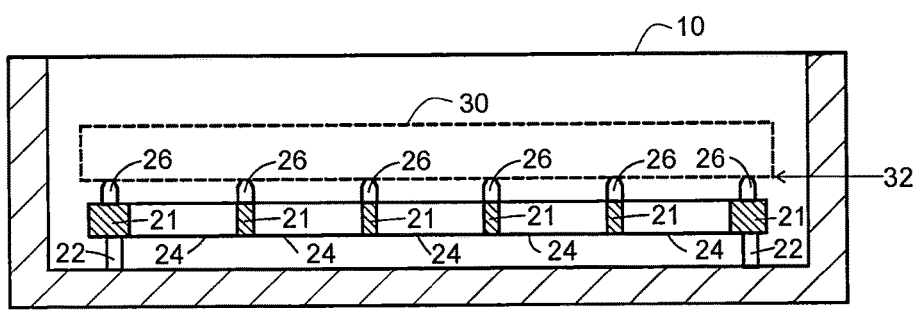
FIG. 6 is a diagram of an apparatus according to one or more embodiments of the present invention.

Reference is now made to FIG. 6 where there is shown a cross-section side view of a dish 10 and an apparatus according to one or more embodiments of the present invention supporting a food item 30. For marinating the underside of food item 30, an amount of marinade (marinade not shown in FIG. 6) would also be present in dish 30 at least up to a level to reach the lower surface of food item 30. Any embodiments of the present invention described above and/or illustrated in FIGS. 1, 2, 3, 4, and 5, could be used as the apparatus in FIG. 6. The apparatus illustrated in FIG. 6 is essentially the same as the embodiment shown in and described for FIG. 3 above.

More specifically, the apparatus shown in cross section in FIG. 6 comprises a substantially planar stage 21 having an upper surface and a lower surface. Substantially planar stage 21 has one or more through holes 24 to allow passage of marinade. Optionally, planar stage 21 may be a grid-like structure with numerous holes 24. For one or more embodiments, planar stage 21 comprises a material such as a food grade material. For one or more embodiments of the present invention, the material is substantially rigid. According to one or more embodiments of the present invention, the apparatus further comprises one or more supports 22 extending from planar stage 21 to hold planar stage 21 away from the bottom of dish 10 an amount sufficient to allow marinade to flow between the underside of planar stage 21 and the bottom of dish 10. Supports 22 may have a variety of dimensions and may have holes and/or passage ways and/or may be spaced apart to establish spacing sufficient to allow marinade flow such as beneath the food item.

As an option for one or more embodiments of the present invention, the one or more supports 22 are shaped to include an inverted spherical cap, an inverted truncated cone, and/or an inverted truncated pyramid which contact the bottom of the dish when the apparatus is in use. The embodiment shown in FIG. 6 has cylindrical shapes for supports 22.

According to one or more embodiments of the apparatus, substantially planar stage 21 has one or more through holes 24 to allow passage of marinade therethrough from the bottom of dish 10 upward to contact underside of the food during marination.

The apparatus further comprises a plurality of projections 26 extending up from planar stage 21. The plurality of projections 26 are sized and disposed so as to support the food. For one or more embodiments of the present invention, plurality of projections 26 comprise a food grade material. Plurality of projections 26 are spaced apart and are of sufficient height to allow marinade flow under the food. For the embodiment shown in FIG. 6, projections 26 include the form of a truncated cone. When in use according to one or more embodiments of the present invention, the apparatus is placed in the dish with marinade so as to hold the underside of the food in contact with the marinade. An amount of marinade is provided to the dish to a level at least up to the lower side of the food item such as at least up to the point indicated by arrow 32 in FIG. 6.

One or more embodiments of the present invention comprise an apparatus for marinating food when used in a dish with marinade. The apparatus comprises a substantially planar stage having an upper surface and a lower surface. The planar stage comprises a food grade material; the substantially planar stage has one or more through holes to allow passage of marinade therethrough. According to one embodiment of the present invention, the one or more through holes have a total area greater than 40% of the area of the planar stage. According to another embodiment of the present invention, the through holes have a total area greater than 50% of the area of the planar stage. The through holes may have a variety of shapes such as, but not limited to, circles, diamonds, ellipses, rectangles, squares, and combinations thereof.

The apparatus also comprises a plurality of projections extending up from the planar stage, the plurality of projections being sized and disposed so as to support the food. The projections being shaped to include a spherical cap, a truncated cone, and/or a truncated pyramid, the plurality of projections comprising a food grade material, the plurality of projections being spaced apart to allow marinade flow across the planar stage and over one or more edges of the planar stage.

The apparatus also comprising one or more supports extending down from the planar stage to hold the planar stage away from the bottom of the dish an amount sufficient to allow marinade to flow between the food and the bottom of the dish, the one or more supports having holes and/or inter spacing to allow marinade flow, the one or more supports being shaped to include an arch, an inverted spherical cap, an inverted truncated cone, and/or an inverted truncated pyramid; and wherein the apparatus in the dish with marinade supports the underside of the food in contact with the marinade.

For one or more embodiments of the present invention, the apparatus comprises a food grade material which is to be interpreted to mean a material that is satisfactory use in handling and processing food. Some examples of food grade materials include, but are not limited to, polypropylene, polyurethane, polyphenylene, polystyrene, polycarbonate, polyvinylchloride, polycarbonate sulfide, polyamide, polyetheretherketone, polyethylene, polyethylenterephatalate, polyoxymethylene, polyphenylensulfide, polytetrafluorethylene, polyvinylidenfluoride and/or combinations thereof. Additional examples of food grade materials suitable for one or more embodiments of the present invention include, but are not limited to, ceramics, glass, pyrex, quartz, stainless steel, and/or combinations thereof.

Another aspect of the present invention pertains to a method of marinating food. According to one embodiment, the method comprises placing in a dish an apparatus substantially the same as the apparatus shown in FIG. 1 through FIG. 5 and describe above. The method includes adding marinade to the dish to a level above or at least at the height of the apparatus. The method also includes placing the food on the apparatus.

Another aspect of the present invention pertains to a method of marinating food. According to one or more embodiments, the method is accomplished using a dish and using marinade. According to one embodiment, the method comprises placing an apparatus in the dish. Optionally, the apparatus comprises a substantially planar stage having an upper surface and a lower surface. The planar stage comprises a material such as a food grade material; and for one or more embodiments of the present invention, the material is substantially rigid. The apparatus further comprises a plurality of projections extending up from the planar stage. The plurality of projections are sized and disposed so as to support the food. For one or more embodiments of the present invention, the plurality of projections comprise a food grade material. The plurality of projections are spaced apart and are of sufficient height to allow marinade flow across the planar stage under the food and over one or more edges of the planar stage. The method further comprises placing the food on the apparatus. The method also comprises adding marinade to a level above or at least at the underside of the food. According to one or more embodiments of the method, the apparatus supports the food so as to hold the underside of the food in contact with the marinade while preventing the marinade from being forced out from beneath the food by the weight of the food.

According to another embodiment of the present invention which is accomplished using a dish and marinade, the method comprises placing an apparatus in the dish. Optionally, the apparatus comprises a substantially a planar stage having an upper surface and a lower surface. The substantially planar stage has one or more through holes to allow passage of marinade. Optionally, the planar stage may be a grid-like structure with numerous holes. For one or more embodiments, the planar stage comprises a material such as a food grade material. For one or more embodiments of the present invention, the material is substantially rigid. According to one or more embodiments of the present invention, the apparatus further comprises one or more supports extending from the planar stage to hold the planar stage away from the bottom of the dish an amount sufficient to allow marinade to flow between the underside of the planar stage and the bottom of the dish. The supports may have a variety of dimensions and may have holes and/or passages ways and/or may be spaced apart to establish spacing sufficient to allow marinade flow such as beneath the food and/or beneath the planar stage. The method further includes adding marinade to the dish to a level above or at least at the height of the apparatus. The method also includes placing the food on the apparatus. According to one or more embodiments of the method, the apparatus supports the food so as to hold the underside of the food in contact with the marinade while substantially preventing the marinade from being forced out from beneath the food by the weight of the food. According to one or more embodiments of the present invention, the method may include placing the apparatus in the dish. The method also includes placing the food on the apparatus. The method further includes adding marinade to a level above or at least at the underside of the food.

According to another embodiment of the present invention which is accomplished using a dish and marinade, the method comprises placing an apparatus in the dish. Optionally, the apparatus comprises a substantially planar stage having an upper surface and a lower surface. The substantially planar stage has one or more through holes to allow passage of marinade. Optionally, the planar stage may be a grid-like structure with numerous holes. For one or more embodiments, the planar stage comprises a material such as a food grade material. For one or more embodiments of the present invention, the material is substantially rigid. According to one or more embodiments of the present invention, the apparatus further comprises one or more supports extending from the planar stage to hold the planar stage away from the bottom of the dish an amount sufficient to allow marinade to flow between the underside of the planar stage and the bottom of the dish. The supports may have a variety of dimensions and may have holes and/or passage ways and/or may be spaced apart to establish spacing sufficient to allow marinade flow such as beneath the food and/or beneath the planar stage.

The apparatus further comprises a plurality of projections extending up from the planar stage. The plurality of projections are sized and disposed so as to support the food. For one or more embodiments of the present invention, the plurality of projections comprise a food grade material. The plurality of projections are spaced apart and are of sufficient height to allow marinade flow under the food. The method further comprises adding marinade to the dish to a level above or at least at the height of the apparatus. The method also comprises placing the food on the apparatus. According to one or more embodiments of the method, the apparatus supports the food so as to hold the underside of the food in contact with the marinade while substantially preventing the marinade from being forced out from beneath the food by the weight of the food. According to one or more embodiments of the present invention, the method may include placing the apparatus in the dish. The method also includes placing the food on the apparatus. The method further includes adding marinade to a level above or at least at the bottom surface of the food.

According to one or more embodiments of the present invention, any of the apparatuses as described above can be used with a dish and marinade. One embodiment of the method comprises placing the apparatus in the dish. The method also includes placing the food on the apparatus. The method also comprises adding marinade to coat the top surface of the food and providing enough marinade to a level above or at least at the bottom surface of the food. The method further includes allowing top and bottom surfaces of the food to marinate simultaneously. More specifically, this method allows both sides of the food to marinate at the same time and there is no need to turn the food over.

Another method according to one or more embodiments of the present invention comprises placing the apparatus in the dish. The method further comprises adding marinade to the dish to a level above or at least at the height of the apparatus. The method also comprises placing the food on the apparatus and allowing the bottom surface of the food to marinate.

In the foregoing specification, the invention has been described with reference to specific embodiments; however, one of ordinary skill in the art appreciates that various modifications and changes can be made without departing from the scope of the present invention as set forth in the claims below. Accordingly, the specification is to be regarded in an illustrative rather than a restrictive sense, and all such modifications are intended to be included within the scope of the present invention.

Benefits, other advantages, and solutions to problems have been described above with regard to specific embodiments; however, the benefits, advantages, solutions to problems, and any element(s) that may cause any benefit, advantage, or solution to occur or become more pronounced are not to be construed as a critical, required, or essential feature or element of any or all the claims.

As used herein, the terms "comprises," "comprising," "includes," "including," "has," "having," "at least one of," or any other variation thereof, are intended to cover a non-exclusive inclusion. For example, a process, method, article, or apparatus that comprises a list of elements is not necessarily limited only to those elements, but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

What is claimed is:

1. An apparatus for marinating food when used in a dish with marinade, the apparatus comprising:
   a substantially planar stage having an upper surface and a lower surface, the planar stage being a grid-like structure having numerous through holes, the through holes being circles, diamonds, ellipses, rectangles, squares, or combinations thereof to allow passage of marinade therethrough, the planar stage comprising polypropylene, polyurethane, polyphenylene, polystyrene, polycarbonate, polyvinylchloride, polycarbonate sulfide, polyamide, polyetheretherketone, polyethylene, polyethylenterephatalate, polyoxymethylene, polyphenylensulfide, polytetrafluorethylene, polyvinylidenfluoride, glass, pyrex, quartz, or combinations thereof;
   a plurality of projections extending up from the planar stage, the plurality of projections being sized and disposed so as to support the food, the plurality of projections being solid, the projections being shaped to include a spherical cap, a truncated cone, a truncated pyramid, or combinations thereof, the plurality of projections comprising polypropylene, polyurethane, polyphenylene, polystyrene, polycarbonate, polyvinylchloride, polycarbonate sulfide, polyamide, polyetheretherketone, polyethylene, polyethylenterephatalate, polyoxymethylene, polyphenylensulfide, polytetrafluorethylene, polyvinylidenfluoride, glass, pyrex, quartz, or combinations thereof, the plurality of projections being spaced apart to allow marinade flow across the planar stage and over one or more edges of the planar stage;
   one or more supports extending down from the planar stage to hold the planar stage away from the bottom of the dish an amount sufficient to allow marinade to flow between the underside of the planar stage and the bottom of the dish, the one or more supports having holes or inter spacing to allow marinade flow, the one or more supports being solid, the one or more supports being shaped to include an arch, an inverted spherical cap, an inverted truncated cone, or combinations thereof; and
   wherein the apparatus in the dish with marinade supports the underside of the food in contact with the marinade.

* * * * *